United States Patent [19]
Okada

[11] Patent Number: 5,611,437
[45] Date of Patent: Mar. 18, 1997

[54] AUTOMATICALLY OPENABLE AND CLOSABLE HOPPER SET FOR A FRUIT WEIGHING AND SORTING MACHINE

[75] Inventor: Masahiro Okada, Chiriyu, Japan

[73] Assignees: Sea-Chang Ting, Hsi, Chih Chen, Taiwan; Shigeo Nakata, Toyokawa, Japan

[21] Appl. No.: 423,467

[22] Filed: Apr. 19, 1995

[51] Int. Cl.⁶ .............................. B07C 5/16; G01G 19/00
[52] U.S. Cl. .......................... 209/592; 209/912; 177/145; 198/704
[58] Field of Search .................................. 209/592, 596, 209/645, 912; 177/50, 145; 198/370.01, 370.04, 704

[56] References Cited

U.S. PATENT DOCUMENTS 4,413,690  11/1983  Peterson ............................. 177/145 X
5,306,877  4/1994  Tas ..................................... 209/912 X

*Primary Examiner*—H. Grant Skaggs
*Assistant Examiner*—Tuan Nguyen
*Attorney, Agent, or Firm*—Bacon & Thomas

[57] ABSTRACT

Disclosed is an automatically openable and closable hopper set for a fruit weighing and sorting machine, wherein a hopper having two lower scale plates and a pivotally connected door is used to carry a fruit to be sorted by weight. The door is normally retained to a closed position by means of a hook portion of an arm member disposed at one side of the hopper. When the carried fruit is heavier than a set value of a weighing device passed by the hopper set, the scale plates of the hopper depress a scale rod of the weighing device, causing the hopper to descend and tilt, which further causes the arm member to shift and the hook portion to release the door from the hopper, permitting the fruit to immediately fall out of the hopper and into a collection box.

1 Claim, 7 Drawing Sheets

5,611,437

AUTOMATICALLY OPENABLE AND CLOSABLE HOPPER SET FOR A FRUIT WEIGHING AND SORTING MACHINE

BACKGROUND OF THE INVENTION

In a conventional fruit weighing and sorting machine, it is provided on a machine bed thereof with a plurality of pans to carry the fruit to be sorted by weight and a weighing device for measuring the weight of fruit on the pans. When the fruit on a pan is heavier than a set value of the weighing device, the weighing device shall tilt and thereby decline the pan, allowing the fruit on the pan to be dumped out of the pan and be collected. In other words, the weighing device and the fruit pans in the conventional fruit weighing and sorting machine must tilt almost at the same time to sort out fruit having a certain predetermined weight. To this purpose, the machine has rather complicated structure and requires longer time for sorting. Another disadvantage of such conventional fruit weighing and sorting machine is that the tilted pan shall apply a considerable force on the weighing device and thereby, adversely affects the accuracy of the weighing device. Moreover, since the fruit to be sorted are not completely the same in their shape and might sometimes stay in the pans even after the latter have been tilted to a certain degree. To ensure the dumping of fruit from the pans, the pans must be tilted to have a larger inclination. Since the pans are disposed at an outer side of the machine chain, it is necessary to increase the width of the machine to tilt the pans further. Meanwhile, the sorting speed is reduced due to the further tilting of the pans.

Furthermore, the conventional fruit weighing and sorting machine is constructed by employing the lever principle and therefore, must be adjusted to find out each and every balance center of the pans lest the accuracy of the sorting machine should be adversely affected. This adjustment is of course time- and labor-consuming.

It is therefore desirable to develop a different fruit weighing and sorting machine which has fruit hoppers with an improved opening mechanism to eliminate drawbacks existing in the fruit pans of the conventional fruit weighing and sorting machine.

SUMMARY OF THE INVENTION

A primary object of the present invention is to provide an automatically openable and closable hopper set for a fruit weighing and sorting machine so that fruit carried by the hopper can be sorted through accurate weighing and then be quickly released from the hopper.

Another object of the present invention is to provide an automatically openable and closable hopper set for a fruit weighing and sorting machine with which a fruit having relatively light weight can still be accurately weighed and sorted.

BRIEF DESCRIPTION OF THE DRAWINGS

The above and other objects of the present invention as well as the special structure and technical means required to operate the present invention can be better understood by referring to the following detailed description of the preferred embodiment and the accompanying drawings, wherein.

DETAILED DESCRIPTION OF THE PREFERRED EMBODIMENT

Figure 1:
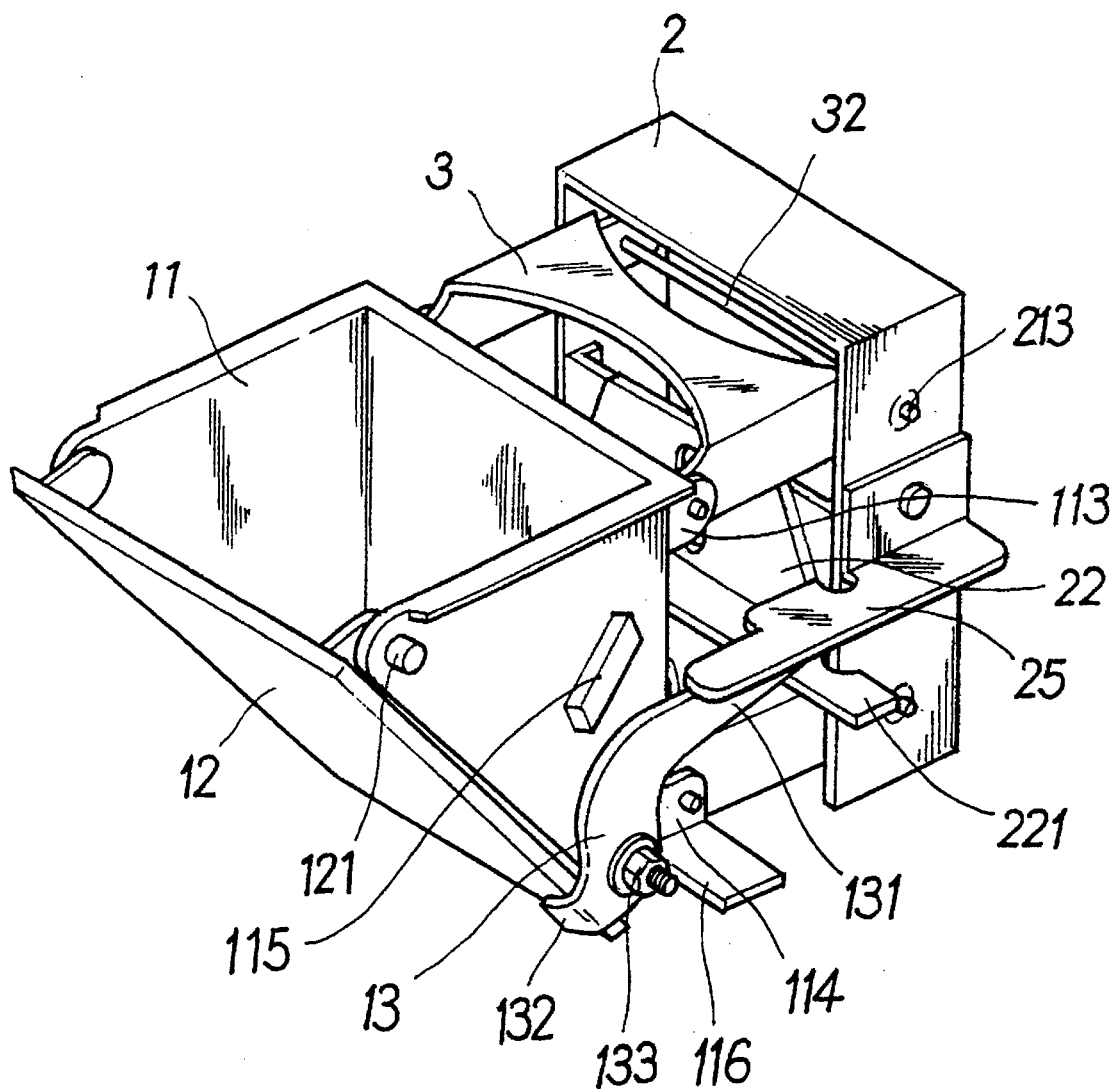
FIG. 1 is a three-dimensional perspective showing an automatically openable and closable hopper set for a fruit weighing and sorting machine according to the present invention.
Figure 2:
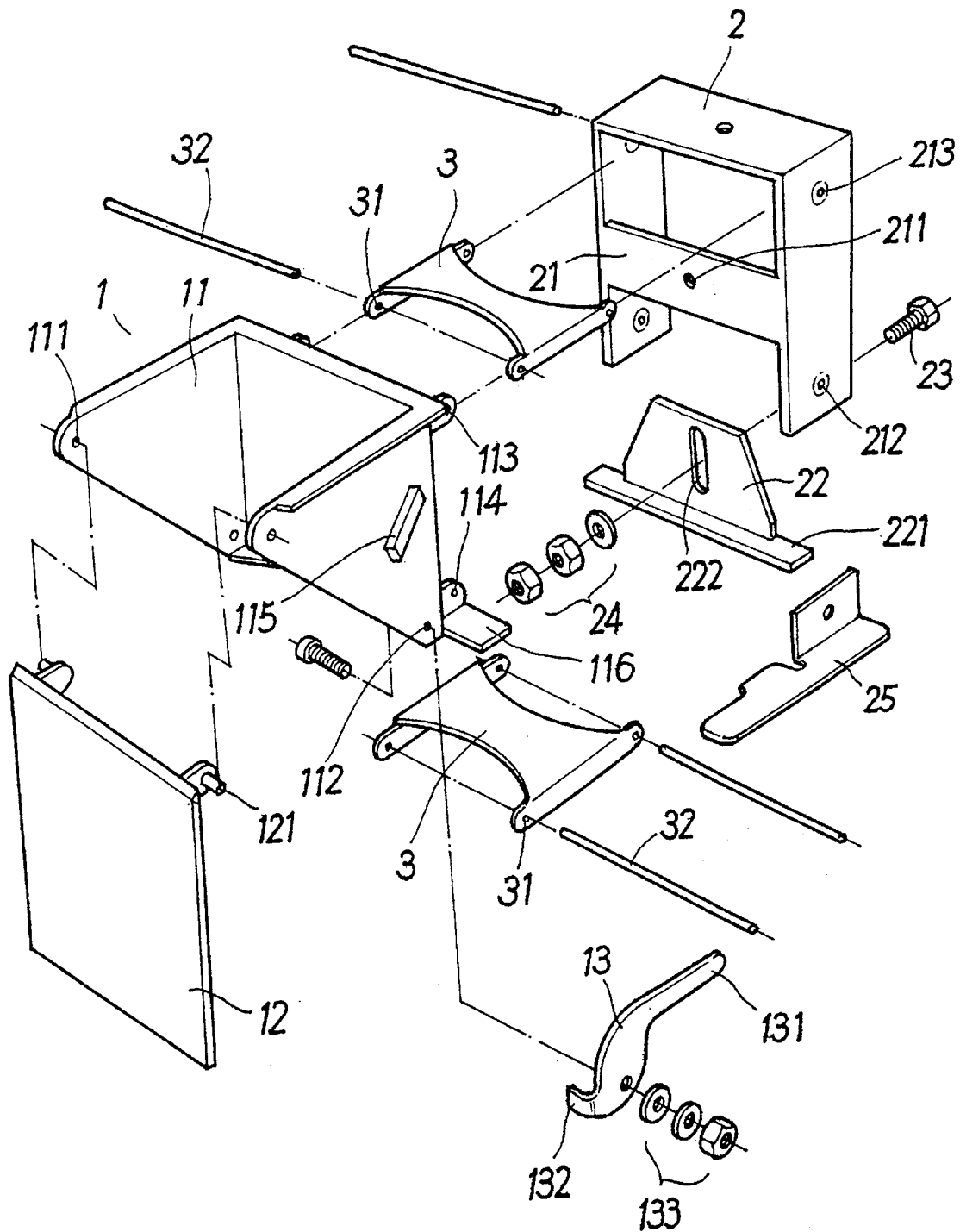
FIG. 2 is an exploded perspective of the hopper set of FIG. 1.

Please refer to FIGS. 1 and 2. The present invention relates to an automatically openable and closable hopper set for a fruit weighing and sorting machine and mainly includes a hopper 1, a support frame 2, and two connecting members 3.

The hopper 1 consists of a main body 11 and a door 12. The main body 11 has an end wall and two side walls all of them vertically extend downward. The two side walls of the hopper 1 are substantially in a shape of right triangle with their inclined sides extending downward and inward and contacting with the door 12. Two first holes 111 are provided at upper ends of the inclined sides of the two side walls such that two pivot pins 121 may extend through them to pivotally attach an upper end of the door 12 to the main body 11. A second hole 112 is provided at a lower end of the inclined side of one of the two side walls such that nuts or threaded means may be extended through them to pivotally connect an arm member 13 thereto. Two first ear members 113 are provided at upper corners of the end wall. Two second ear members 114 are provided at lower corners of the end wall. Two laterally extended scale members 116 are provided at two outer sides of the two second ear members 114. The scale members 116 may be parts additionally mounted on the two second ear members 114 or be integral and continued portions of the second ear members 114, and may be in a plate form, a needle form, a rod form, or any other suitable forms. In the embodiment illustrated in this Specification and the attached drawings, the scale members 116 are in the form of two plates. A stopper 115 is provided on an outer surface of the side wall to which the arm member 13 is attached. The arm member 13 has a link portion 131 at one end and a hook portion 132 at the other end opposite to the link portion. The hook portion is so formed that it may retain the door 12 to the main body 11 so that the hopper 1 is in a closed state.

The two connecting members 3 interconnect the hopper 1 to the support frame 2 and have locating holes 31 provided at front and rear ends of each lateral side thereof. Two first locating shafts 32 are respectively extended through two upper front locating holes 31 and the first ear members 113 of the hopper 1 as well as two lower front locating holes 31 and the two second ear members 114 to pivotally connect the hopper 1 to the connecting members 3.

The support frame 2 is disposed in front of the hopper 1 in the moving direction of the fruit weighing and sorting machine and serves as a fixing base of the hopper 1. The support frame 2 is substantially n-shaped with a supporting plate 21 which transversely extends between its two vertical side walls near a middle portion thereof. Two pairs of pivot holes 212,213 are provided on the two side walls of the support frame 2 near a lower and an upper portion thereof, respectively. Two second locating shafts 32 are respectively extended through the two pivot holes 213 of the support frame 2 and the two upper rear locating holes 31 of the connecting members 3 as well as the two pivot holes 212 and the two lower rear locating holes 31 to pivotally connect the support frame 2 to the connecting members 3. A threaded hole 211 is formed on the supporting plate 21 for mounting a trapezoid member 22 to the support frame 2 by means of an adjusting screw 23 and a fixing nut 24. The trapezoid member 22 has a vertically extended long slot 222 formed at a middle portion thereof to allow adjustment of the trapezoid member 22 in its Vertical position relative to the supporting plate 21. The trapezoid member 22 further has two laterally extended lower portions forming two stopping means 221. A stopping plate 25 is fastened to an outer surface of one of the side wall of the support frame 2 at a predetermined position such that the link portion 131 of the arm member 13 is stopped thereat with the hook portion 132 retaining the door 12 to the main body 11.

Figure 3:
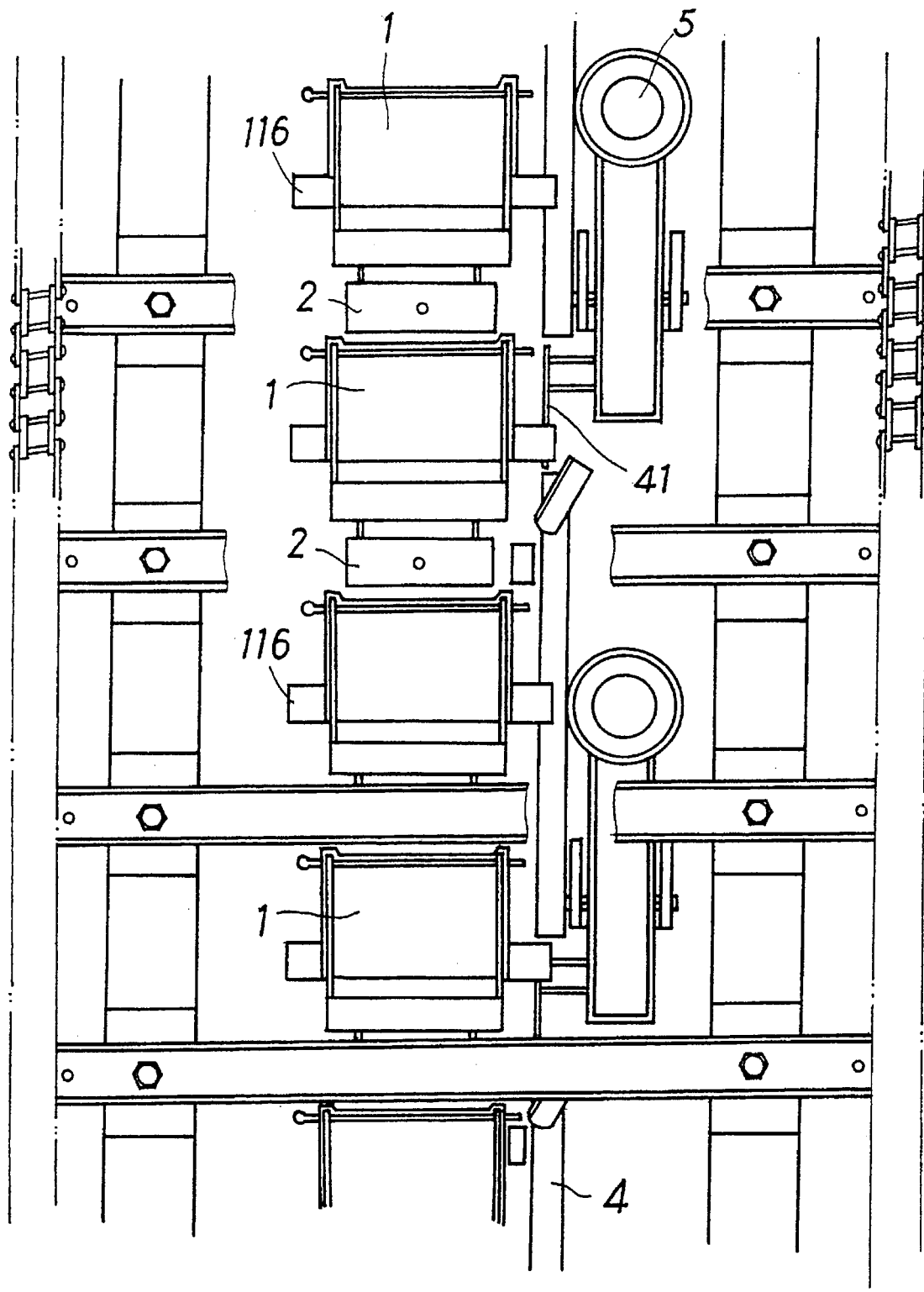
FIG. 3 is a fragmentary, schematic view showing the manner in which multiple sets of automatically openable and closable hoppers according to the present invention are arranged in the fruit weighing and sorting machine for operation.
Figure 4:
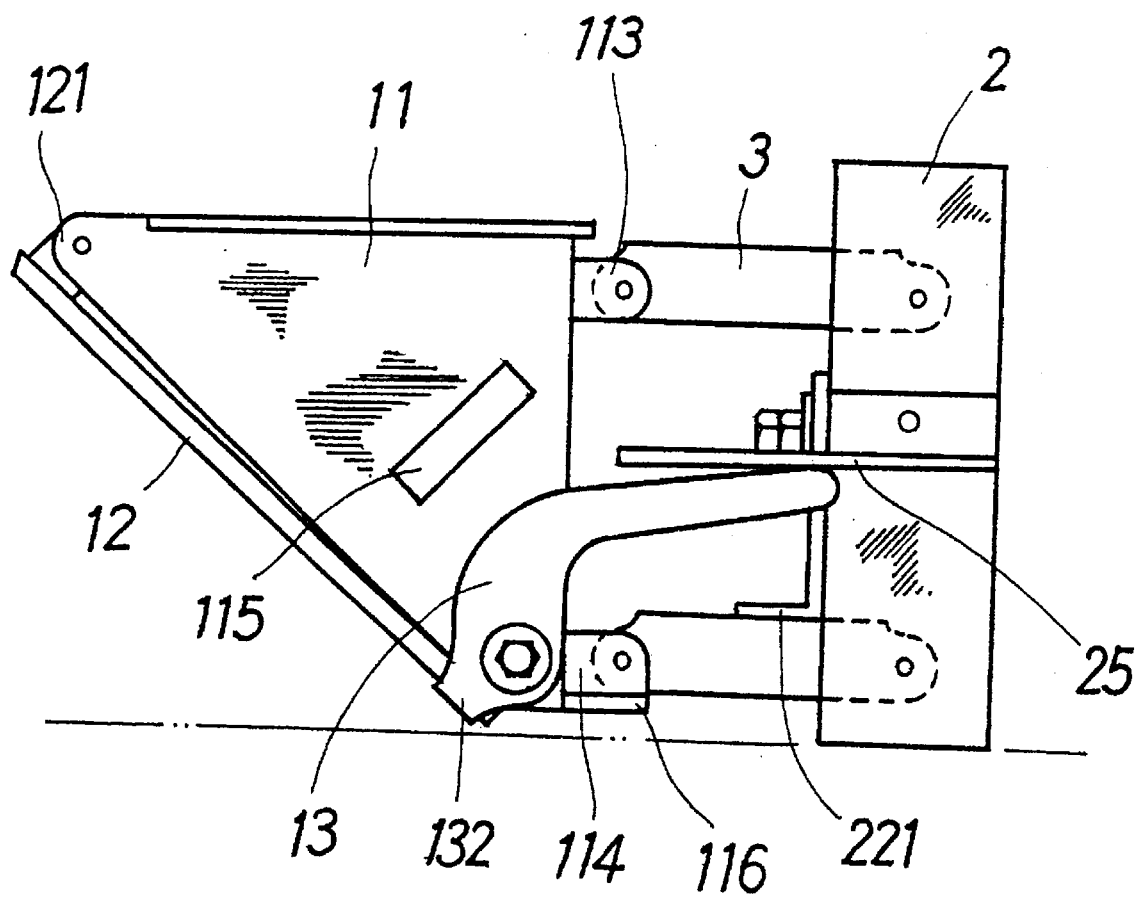
FIG. 4 illustrates the hopper set of the present invention in a closed state.
Figure 5:
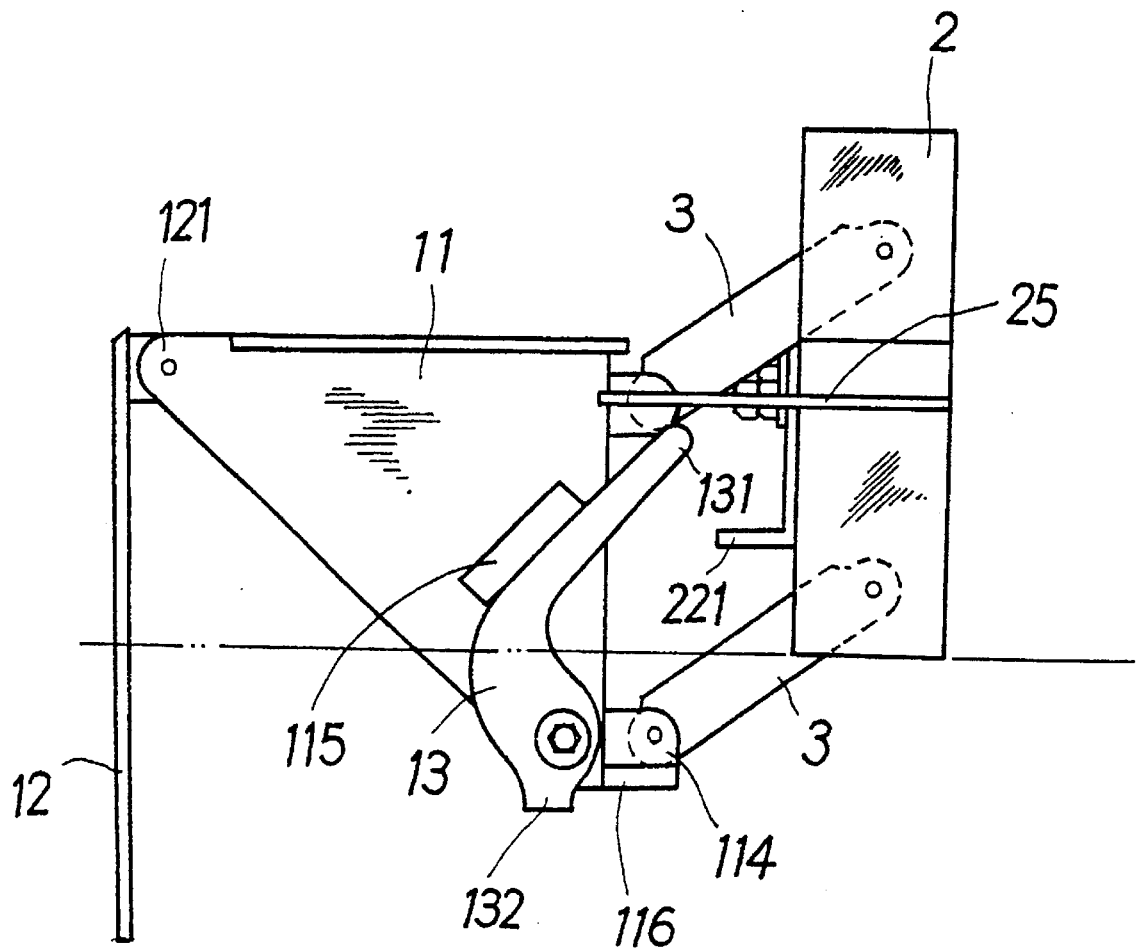
FIG. 5 is another view showing the hopper set of the present invention in an opened state.

Please now refer to FIGS. 3 to 6. FIG. 3 illustrates that a plurality of hopper sets of the present invention are serially mounted over a continuous and circulated track 4 of the fruit weighing and sorting machine with their two laterally extended scale plates 116 sliding on the track 4. A series o,f weighing devices 5 are disposed at one side of the track 4 at predetermined positions. It is to be understood that multiple parallel tracks 4 can be arranged to support multiple parallel lines of hopper sets thereon to largely increase the capacity of the fruit weighing and sorting machine.

The weighing devices 5 each includes a weight pan for putting a number of standard weights therein. The weighing devices 5 are so arranged that a first one is always graded heavier than the next succeeding one in the moving direction of the machine. And this principle is applied to each and every subsequent weight pans.

Figure 7:
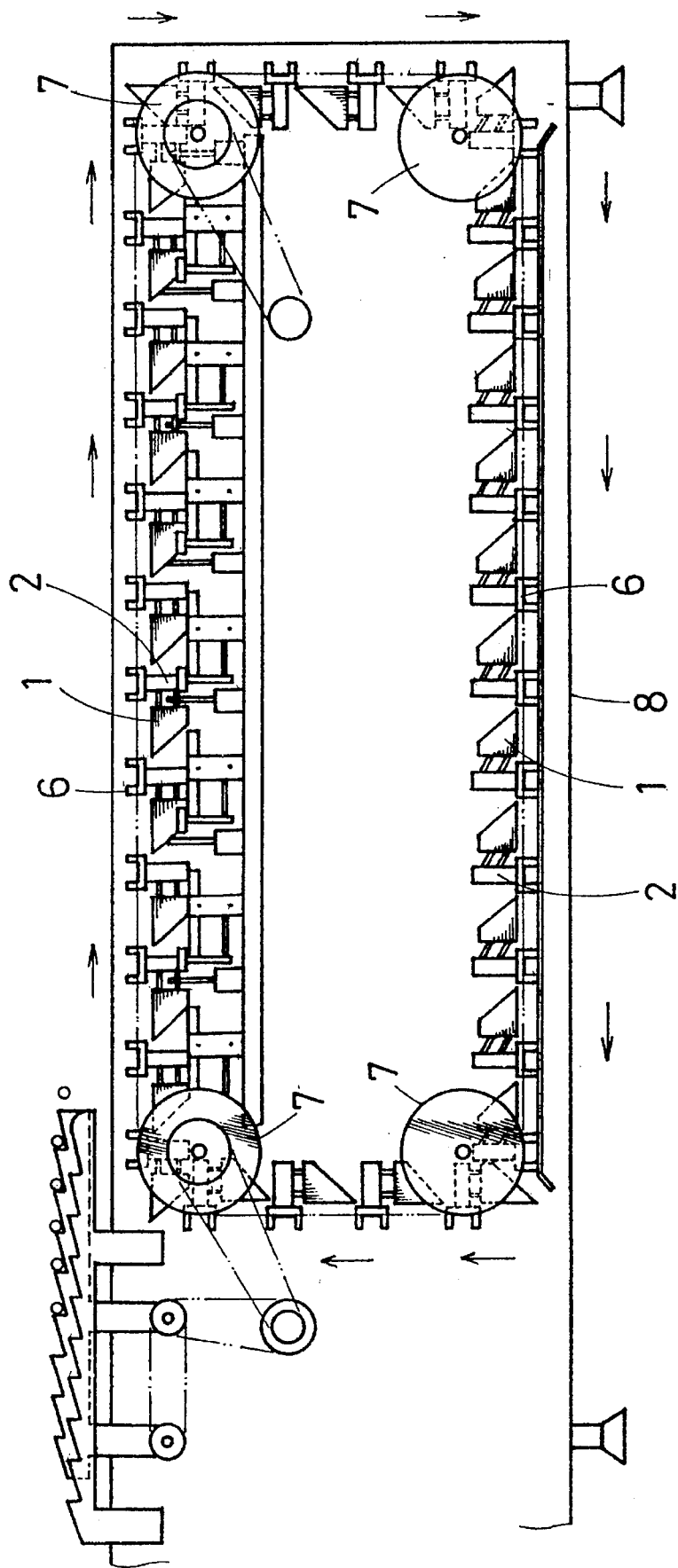
FIG. 7 is a side view showing a whole fruit weighing and sorting machine of the present invention and the movement and operation of the hopper sets thereof on the machine.

As shown in FIG. 7, the fruit weighing and sorting machine of the present invention includes a machine bed 8 on which a continuous and circulated track 4 is provided so that a plurality of hopper sets of the present invention are respectively fixedly connected at their support frames 2 to fixing bases 6 on the machine and be driven to move along the track 4 in a direction shown by the arrows. Pieces of fruit are sequentially fed into the hoppers t by an automatic fruit feeding machine disposed above a beginning point of the continuous and circulated track 4 such that each hopper 1 shall receive one single piece of fruit. The hopper 1 carrying a piece of fruit slides on the track 4 and passes by the weighing devices 5. When the fruit in the hopper 1 is lighter than a weight set by the standard weights put in the weight pan of one of the weighing devices 5 passed by the hopper 1, the two scale plates 116 of the hopper 1 fail to depress a scale rod 41 extended from the particular weighing device 5 and the hopper set keeps approaching to the next weighing device 5 to contact a beginning end of the next scale rod 41 of the next weighing device 5. If the fruit in the hopper 1 is heavier than the weight set by the standard weights put in the pan of the next weighing device 5, the scale plates 116 of the hopper 1 shall depress the next scale rod 41 and are no longer supported by the track 4. At this point, the support frame 2 is still fixed to the respective fixing base 6 of the fruit weighing and sorting machine while the hopper 1 falls causing the arm member 13 pivotally connected to one side of the hopper 1 to descend, too. The descent of the arm member 13 causes the link portion 131 thereof to ascend relative to the hook portion 132 until it is stopped by the stopper 115. At this point, the hook portion 132 of the arm member 13 disengages from the door 12 to let the latter open at the same time without any delay. The fruit in the hopper 1 falls down into a collection box immediately at the time the door 12 is opened and the hopper 1 keeps moving forward with the door 12 in the open position.

Figure 6:
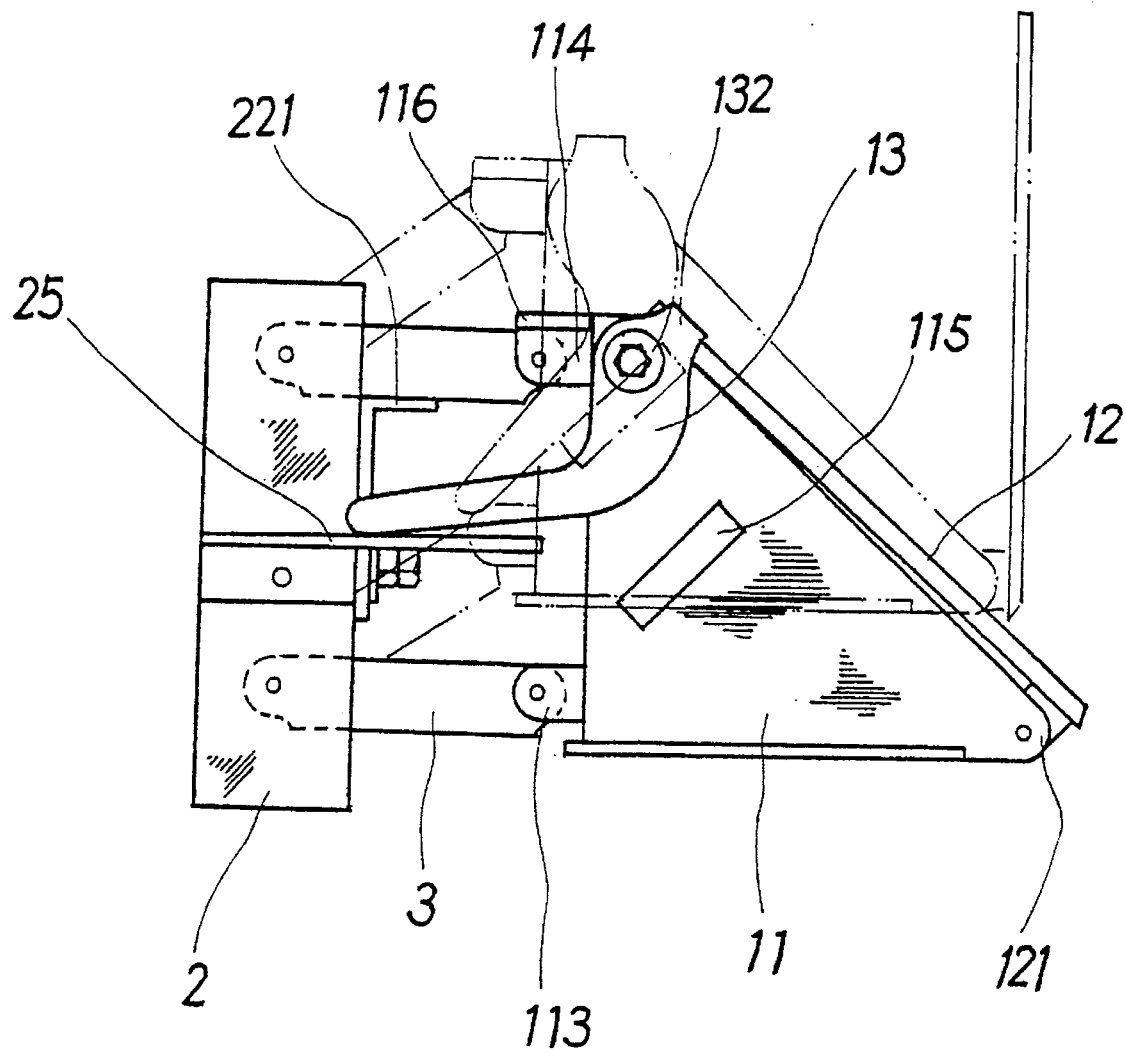
FIG. 6 illustrates the process in which the hopper set in an opened state is changed into a closed state.

When the hopper set moves to a first point on the track 4 at where it turns it descends vertically with its Opening facing upward, as more clearly shown in FIG. 6. Accordingly, the door 12 naturally falls down to close the hopper 1. When the hopper set keeps moving downward and reaches a second point on the track 4 at where it turns again it then moves horizontally with the hopper set upside down. At this point, the link portion 131 and accordingly, the arm member 13, fall down freely, causing the hook portion 132 to retain the door 12 and thereby firmly close the hopper 1 again. At this point, the link portion 131 of the arm member 13 is stopped by the stopping plate 25 without further falling downward. When the hopper set moves to a third point on the track 4 at where it turns again, it ascends vertically until it returns to the beginning point on the track 4 at where the hopper set resumes its normal position in a closed state.

The movements of receiving one single piece of fruit from the feeding machine by each hopper 1 at the beginning point of the continuous and circulated track 4, of sending the hopper sets forward along the track 4 to pass by the weighing devices 5, of depressing the scale rods 41, of opening the door 12 when the fruit in the respective hopper 1 is heavier than the set weight in the weighing pan of the corresponding weighing device 5 passed by the hopper 1, and of automatically closing the door 12 to the hopper 1 again on the course the hopper set moves back to the beginning point of the track 4 occurs again and again, and each weighed and sorted fruit falls down into a collection box at the same time the door 12 of the hopper 1 is opened without any delay.

That is, there is not any significant force applied by the hopper sets to the weighing devices 5 to adversely; affect the accuracy of the weighing devices 5 when the hopper sets move along the full length of track 4 on the machine bed 8. Since the descent of the hopper 1, the opening of the door 12, and the falling down of the fruit from the hopper 1 almost occur at the same time, the time required to sort the pieces of fruit by weight is largely reduced and the efficiency of the fruit sorting machine is largely increased. In other words, the most important advantage provided by the present invention is the largely enhanced sorting speed of the machine. Moreover, the present invention employs the principle of ideal unimpeded falling motion of a body in its structure and therefore, all the parts thereof, including the hopper 1, the door 12, and the arm member 13, automatically function without being interfered with by any force applied from different directions. For this reason, the fruit weighing and sorting machine with the hopper sets according to the present invention may function at high accuracy and this is another advantage thereof.

What is claimed is:

1. An automatically openable and closable hopper set for a fruit weighing and sorting machine, comprising; a hopper for carrying a fruit therein to be sorted by weight; a support frame fixed to a fixing base of said fruit weighing and sorting machine and disposed in front of said hopper to pivotally connect said hopper via two connecting members by means of a pivot shaft; said hopper being provided with a door pivotally connected to an upper edge thereof such that said door forms a downwardly and inwardly inclined surface of said hopper; two laterally and outwardly extending scale plates on said hopper for supporting said hopper on a continuous track of said fruit weighing and sorting machine to slide thereon; an arm member located at a lateral side of the hopper having a link portion normally stopped by a stopping plate attached to one side of said support frame so that a hook portion of said arm member opposite to said link portion retains said door to said hopper to close same; wherein, when said hopper carries a fruit fed into it by a feeding machine disposed above said weighing and sorting machine at a beginning point of said track and slides on said track with said two scale plates contacting with said track, said hopper shall pass by a series of weighing devices which are set to different values, that when said fruit in said hopper is heavier than one of said set values of one of said weighing devices passed by said hopper, said scale plates depress a scale rod extending from said weighing device where no track is provided to support said hopper, causing said hopper to pivotally tilt down relative to said support frame, said arm member shifts following the tilting of said hopper and causes said link portion thereof to disengage from said stopping plate which in turn causes said hook portion of said arm member to disengage from said door and release the latter from said hopper, allowing said fruit in said hopper to fall out and down into a collection box, said opened door automatically closes said hopper again when said hopper keeps moving on said track to a first point where said hopper turns and descends vertically with said door located at a position above said hopper and closing same, and said hook portion of said arm member automatically retains said closed door to said hopper when said hopper moves to a second point on said tracks where said hopper turns and slides horizontally in an upside down position until said hopper moves back to said beginning point of said track.

* * * * *